Patented Oct. 11, 1938

2,133,040

UNITED STATES PATENT OFFICE 2,133,040

PRODUCTION OF RUBBER FROM POINSETTIA SERUM

Herman E. Pitman, St. Louis, Mo.

No Drawing. Application February 21, 1935, Serial No. 7,638

7 Claims. (Cl. 18—49)

This invention relates to the production of crude rubber from a special variety of poinsettia and to a novel mode of treatment of the serum extracted therefrom. The idea is to provide a new source of commercial rubber which can be produced at a relatively small cost and which is superior, in many respects, to ordinary crude rubber now on the market. Other aims and advantages of the invention will appear in the specification.

Considerable research work has been done to locate commercial sources of rubber, especially in the investigation of tropical and semi-tropical plants and shrubs which can be grown in parts of this country. Insofar as I am aware, no one has heretofore discovered or developed any source of rubber or latex which can compete successfully with the imported product. In fact, rubber manufacturers have practically abandoned the idea of developing a hearty plant or shrub indigenous to this country having enough latex in its serum to justify its exploitation; although small quantities of crude rubber have been produced from the golden-rod and the guayule shrub. As a result of years of study and investigations, I have discovered a variety of poinsettia which produces a serum containing a high percentage of latex. This plant grows in abundance in the state of Guerrero, Mexico, and reaches an average maximum height of from six to eight feet. Its leaves, at maturity, are approximately five inches wide and eight inches long. The stalk grows to a maximum diameter of about one and one-eighth inches. Otherwise, it is quite similar to the multitude of varieties of this plant which grow in the southern part of the United States. For the sake of identification I shall call it the large-leaf Guerrero poinsettia. My experiments have demonstrated that its serum contains from sixty percent to sixty seven percent of recoverable latex.

I have also discovered that the serum from this plant quickly becomes rancid after it is extracted and exposed to the air and this destroys the latex. As a matter of fact the latex is practically destroyed within a single day. In accordance with my invention I preserve the serum indefinitely, so that it can be shipped or stored in drums or containers and delivered to central coagulation plants for final treatment. The serum is extracted from the harvested plants by any of the known methods, conveniently by reducing the stalks, stems and leaves to a pulp and pressing out the juice; although it is contemplated that the latex may be obtained from the pulp by means of suitable, well known solvents.

I have found that the serum can be preserved indefinitely by adding simple and inexpensive chemicals which can be partially recovered during the final stage of the treatment. I prefer to employ a preserving solution containing commercial ammonia, which prevents coagulation. For example, I make a solution containing six parts, by volume, of ammonia, one part, by volume, of sodium chloride and two parts, by volume, of dextro-tartaric acid and add about one and one-eighth percent, by volume, of this mixture or solution to the serum. Then the serum is thoroughly agitated for several minutes in a suitable container. This is done immediately after the serum is extracted and before it begins to turn rancid. The treated serum is then ready to be stored in tanks or put in shipping containers for delivery to a coagulating plant. The ammonia and the dextro-tartaric acid prevent any rancidity. I believe that the dextro-tartaric acid acts as a catalytic agent on the ammonia. It will preserve the serum even after a part of the ammonia evaporates in an open container. The sodium chloride is added at this stage so that it commingles thoroughly with the latex and imparts toughness to the final product. This also increases the tensile strength by as much as ten percent.

While the preserved serum may be coagulated by the well known methods of treating latex, I prefer to employ a coagulant solution consisting of three parts, by volume, of acetic acid and one to two parts, by volume, of formic acid. One percent to one and a quarter percent of this solution by volume is mixed with the serum and the serum is again slowly agitated until all of the latex coagulates into a plastic mass of uniform consistency. The coagulated mass is then fed through smooth squeezing rolls to remove and reclaim the excess chemical solution. It is reduced to sheet form by these rolls and is fed continuously through a cracking washer having three herringbone rolls. Sprays of warm water at a temperature of approximately 120 degrees Fahrenheit are discharged on the sheets as they pass through the rolls. The rubber is thoroughly ground by the washing rolls and the water removes the remaining chemicals. The rubber is then passed through corrugated sheeting rolls to convert it into final sheet form. It is then hung up in drying rooms and exposed to a temperature of 95 degrees Fahrenheit to 105 degrees Fahrenheit for a period of five to seven days. It is then ready for the market as commercial crude rubber.

I have found that crude rubber produced from the particular serum has greater tensile strength, elasticity and elongation than crude rubber obtained from Hevea trees or other well known commercial sources. For example, tests of representative samples of vulcanized rubber, made according to the same formula, have shown that this rubber has seventeen percent greater tearing resistance than that of rubber made from what is known commercially as first latex.

From the foregoing description, it will be apparent that the improved process reduces the cost of production to a minimum. The particular plants can be cultivated and grown at a relatively low cost. It is contemplated that the actual cost of producing the crude rubber in quantity will be less than five cents per pound.

Having thus explained the nature of my invention and one illustrative example of the process with the express understanding that it is not to be construed as being limited to strict conformity therewith, what I claim and desire to secure by Letters Patent is:

1. As a commercial product, the serum of the large-leaf Guerrero poinsettia preserved against rancidity with a preserving agent containing commercial ammonia and a small quantity of sodium chloride.

2. As a commercial product, the serum of the large-leaf Guerrero poinsettia preserved against rancidity with a preserving solution consisting of a small quantity of ammonia, sodium chloride and dextra-tartaric acid.

3. In the art of producing crude rubber, the steps which are characterized by extracting the serum from the large-leaf Guerrero poinsettia, and immediately adding thereto a small quantity of a preserving solution containing ammonia and dextro-tartaric acid.

4. In the art of producing crude rubber, the steps which are characterized by extracting the serum from the large-leaf Guerrero poinsettia, and immediately mixing therewith a preserving solution consisting of ammonia, sodium chloride and dextra-tartaric acid.

5. In the art of producing crude rubber, the steps which are characterized by extracting the serum from the large-leaf Guerrero poinsettia, and immediately mixing therewith approximately one and one-eighth percent by volume a preserving solution consisting of about six parts ammonia, one part sodium chloride, and two parts dextro-tartaric acid.

6. That method of producing crude rubber from large-leaf Guerrero poinsettia, which is characterized by extracting the serum; immediately adding approximately one and one-eighth percent by volume of a preserving solution containing ammonia, sodium chloride, and dextro-tartaric acid; transferring the preserved serum to a coagulating plant; adding a coagulating solution containing acetic acid and formic acid; and then squeezing, washing, grinding, sheeting and drying the product.

7. In the art of producing crude rubber from the serum of large leaf Guerrero poinsettia, that method of coagulating the serum which consists in producing a coagulant solution composed of approximately three parts by volume of acetic acid and one to two parts by volume of formic acid; mixing approximately 1% by volume of the solution with the serum; and mixing the mass until the latex coagulates into a plastic mass of uniform consistency.

HERMAN E. PITMAN.